US012128461B2

(12) United States Patent
Luke

(10) Patent No.: US 12,128,461 B2
(45) Date of Patent: Oct. 29, 2024

(54) AUTOMATED PORTABLE CONTAINER CLEANING

(71) Applicant: The Modern Group, Ltd., Beaumont, TX (US)

(72) Inventor: Robert P. Luke, Youngsville, LA (US)

(73) Assignee: THE MODERN GROUP, LTD., Beaumont, TX (US)

( * ) Notice: Subject to any disclaimer, the term of this patent is extended or adjusted under 35 U.S.C. 154(b) by 66 days.

(21) Appl. No.: 18/196,902

(22) Filed: May 12, 2023

(65) Prior Publication Data

US 2023/0405647 A1 Dec. 21, 2023

Related U.S. Application Data

(60) Provisional application No. 63/343,777, filed on May 19, 2022.

(51) Int. Cl.
*B08B 9/093* (2006.01)
*B08B 9/08* (2006.01)

(52) U.S. Cl.
CPC ............ *B08B 9/093* (2013.01); *B08B 9/0821* (2013.01); *B08B 9/0861* (2013.01); *B08B 2209/08* (2013.01)

(58) Field of Classification Search
None
See application file for complete search history.

(56) References Cited

U.S. PATENT DOCUMENTS

2014/0033940 A1* 2/2014 Simpson ................ B62D 65/18 104/119
2015/0375278 A1* 12/2015 DesOrmeaux .......... B08B 9/093 134/166 R

FOREIGN PATENT DOCUMENTS

WO WO-2015011685 A2 * 1/2015 .............. B60P 1/165

* cited by examiner

*Primary Examiner* — Eric W Golightly
(74) *Attorney, Agent, or Firm* — Ewing & Jones, PLLC

(57) ABSTRACT

A container cleaning apparatus includes a frame and a platform assembly pivotably coupled to the frame. The platform assembly includes a platform, guide walls coupled to the platform, a back wall coupled to the platform, and a front gate, the front gate slidingly coupled to the platform. The container cleaning apparatus also includes a fork assembly, the fork assembly including a fork movable between a locked position and an unlocked position and a cleaning nozzle assembly.

9 Claims, 10 Drawing Sheets

AUTOMATED PORTABLE CONTAINER CLEANING

CROSS-REFERENCE TO RELATED APPLICATIONS

This application is a nonprovisional application which claims priority from U.S. provisional application No. 63/343,777, filed May 19, 2022, which is incorporated by reference herein in its entirety.

TECHNICAL FIELD/FIELD OF THE DISCLOSURE

The present disclosure relates to container handling, and specifically to container cleaning.

BACKGROUND OF THE DISCLOSURE

Portable containers and tanks are used for a multitude of purposes including the transportation of goods and waste. For example, containers may be used to transport cuttings and other debris from offshore drilling sites to onshore disposal facilities. Containers may then be returned to the offshore rigs for reuse. However, any residue within the containers must be cleaned out before sending the containers to the users. Depending on the size of the containers, manual manipulation thereof may be difficult or dangerous to the cleaning personnel.

SUMMARY

A container cleaning apparatus is disclosed. The container cleaning apparatus includes a frame and a platform assembly pivotably coupled to the frame. The platform assembly includes a platform, guide walls coupled to the platform, a back wall coupled to the platform, and a front gate, the front gate slidingly coupled to the platform. The container cleaning apparatus also includes a fork assembly, the fork assembly including a fork movable between a locked position and an unlocked position and a cleaning nozzle assembly.

A method is disclosed. The method includes positioning a container on a container cleaning apparatus, the container cleaning apparatus including a frame and a platform assembly pivotably coupled to the frame. The platform assembly includes a platform, guide walls coupled to the platform, a back wall coupled to the platform, and a front gate, the front gate slidingly coupled to the platform. The container cleaning apparatus also includes a fork assembly, the fork assembly including a fork movable between a locked position and an unlocked position and a cleaning nozzle assembly. The method also includes engaging the container with the fork of the fork assembly and pivoting the platform assembly relative to the frame. The method also includes at least partially inverting the container and engaging the cleaning nozzle assembly to spray a cleaning fluid into the interior of the container.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
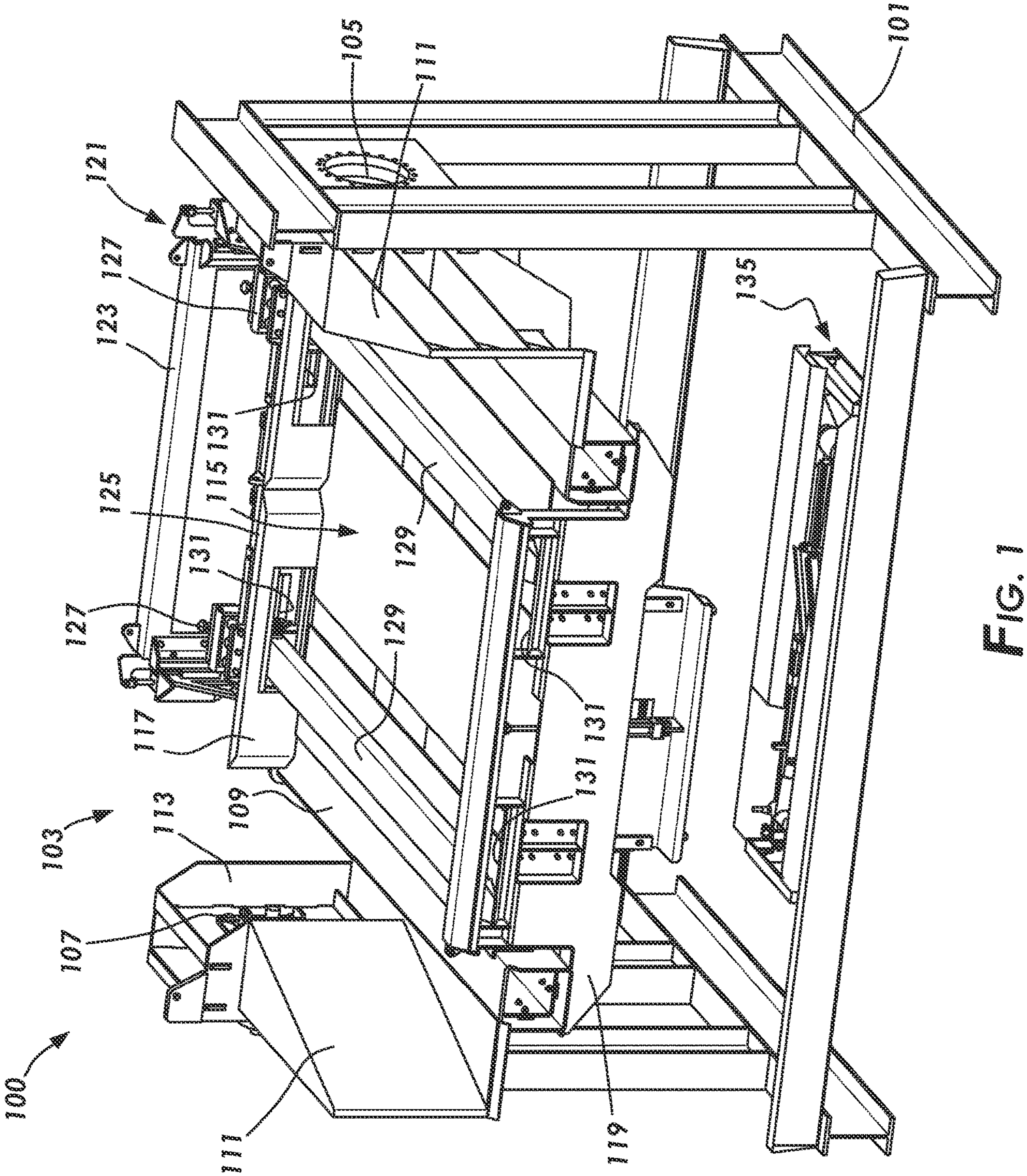
FIG. 1 is a perspective view of a container cleaning apparatus consistent with at least one embodiment of the present disclosure in a transport or initial position.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 depicts container cleaning apparatus 100 consistent with at least one embodiment of the present disclosure. Container cleaning apparatus 100 may include frame 101 which may be used to support one or more components of container cleaning apparatus 100. Container cleaning apparatus 100 may include platform assembly 103. Platform assembly 103 may be mechanically coupled to frame 101 by one or more bearings 105 such that platform assembly 103 may be pivoted relative to frame 101 as further described herein below. In some embodiments, container cleaning apparatus 100 may include pivot driver 107 positioned to cause platform assembly 103 to rotate relative to frame 101. In some embodiments, for example and without limitation, pivot driver 107 may include one or more of a hydraulic motor, pneumatic motor, hydraulic cylinder, pneumatic cylinder, electromechanical linear actuator, or electric motor.

In some embodiments, platform assembly 103 may include platform 109, guide walls 111, and width guides 113, which may define the floor and sides of load pocket 115 into which a container may be loaded as further described below. In some embodiments, guide walls 111 may be tapered to assist with the insertion of a container into load pocket 115. In some embodiments, width guides 113 may be repositionable or pivotable relative to guide walls 111 to, for example and without limitation, assist with locating a container within load pocket 115 by allowing the width of load pocket 115 to substantially match the width of the container.

In some embodiments, platform assembly 103 may include back wall 117. Back wall 117 may define the rear extent of load pocket 115.

In some embodiments, platform assembly 103 may include front gate 119. Front gate 119 may be mechanically coupled to platform 109 such that front gate 119 may move from a position wherein front gate 119 at least partially extends above platform 109 such that front gate 119 defines a forward extent of load pocket 115, referred to herein as a closed position shown in FIG. 1, to a position wherein front gate 119 is below or otherwise out of alignment with platform 109 to allow a container to be inserted into load pocket 115, referred to herein as an open position shown in FIG. 2. For example and without limitation, front gate 119 may slide or pivot out of the way. In some embodiments, front gate 119 may be moved by one or more hydraulic cylinders.

Figure 2:
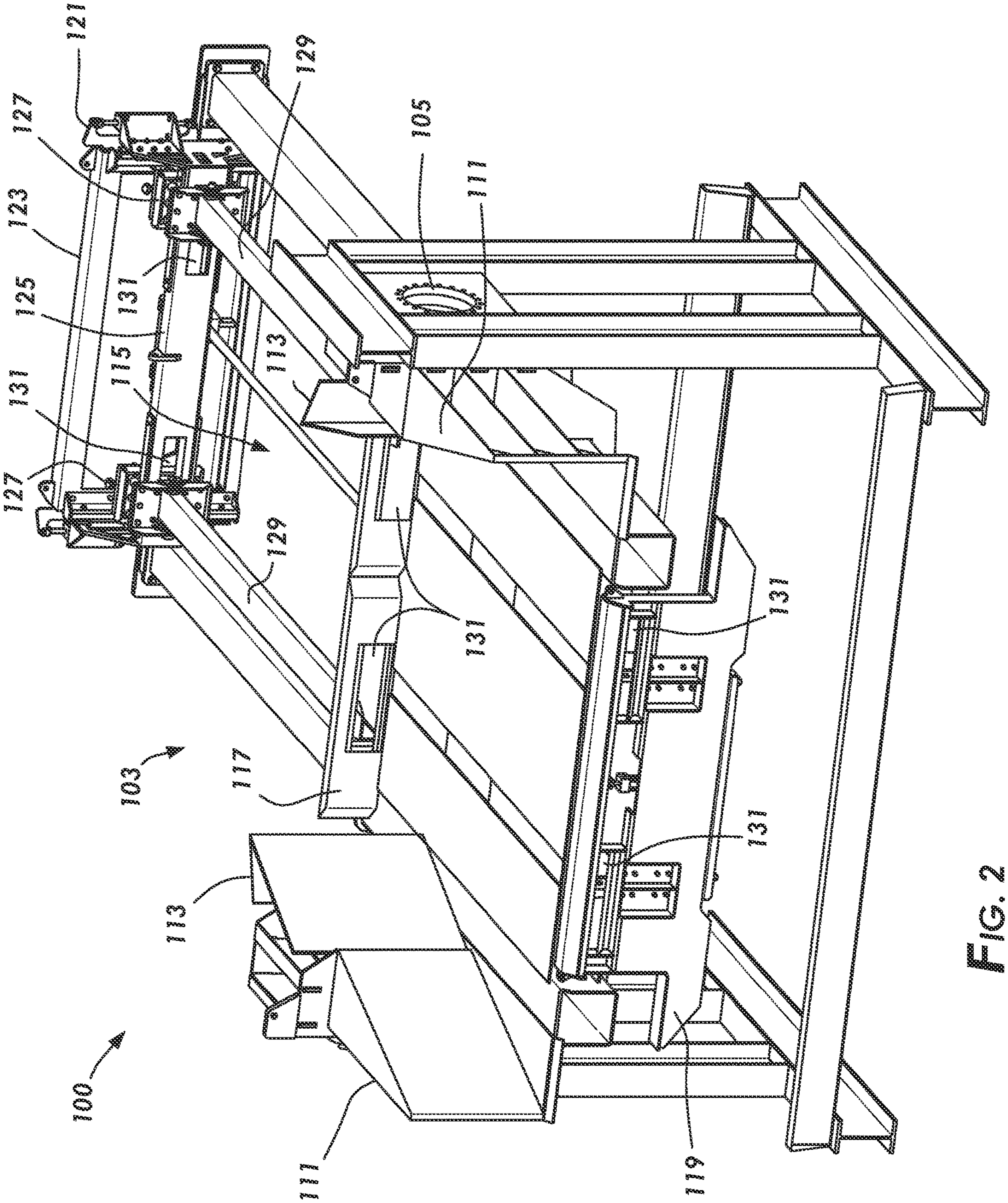
FIG. 2 is a perspective view of the container cleaning apparatus of FIG. 1 in an open position.

In some embodiments, platform assembly 103 may include fork assembly 121. Fork assembly 121 may include fork positioning frame 123, fork height adjustment frame 125, fork lateral adjustment frames 127, and forks 129. Fork positioning frame 123 may be slidably coupled to platform 109 such that fork positioning frame 123 is movable between a locked position wherein forks 129 are located above platform 109 as shown in FIG. 1 to an unlocked position wherein forks 129 are positioned out of alignment with platform 109 as shown in FIG. 2. When in the locked position, forks 129 may engage and traverse fork points 12 formed in a container to retain the container to container cleaning apparatus 100 as further described herein below.

In some embodiments, back wall 117 and front gate 119 may include fork holes 131 positioned to allow forks 129 to extend therethrough when in the locked position and, for example and without limitation, provide support for a container held by forks 129 when inverted as further described herein below. In some embodiments, fork positioning frame 123 may be movable relative to platform 109 by one or more of a hydraulic cylinder, pneumatic cylinder, or electromechanical linear actuator.

Figure 1A:
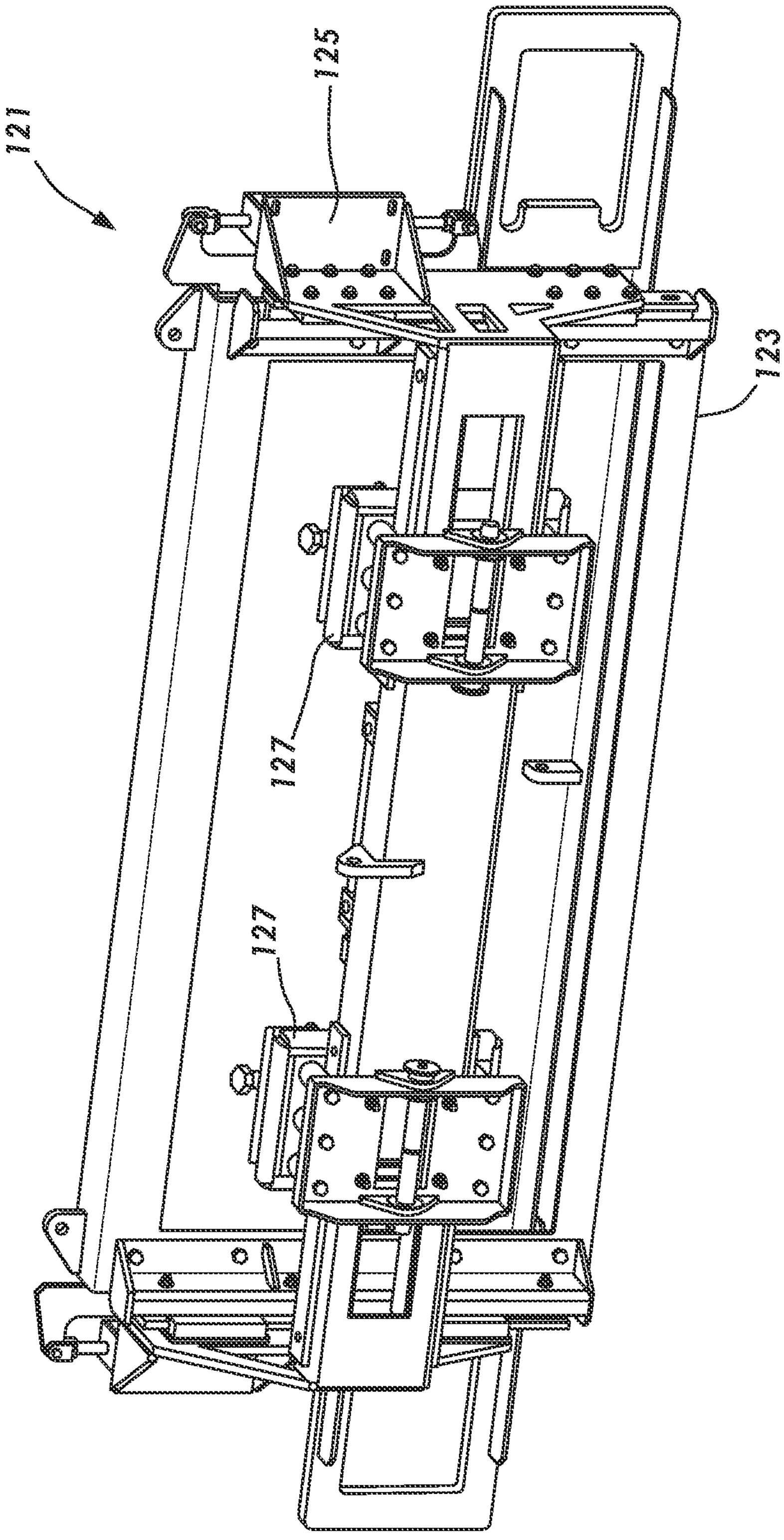
FIG. 1A is a perspective view of a fork height assembly of the container cleaning apparatus of FIG. 1 consistent with at least one embodiment of the present disclosure.

In some embodiments, fork height adjustment frame 125, as shown in FIG. 1A, may be mechanically coupled to fork positioning frame 123 such that fork height adjustment frame 125 may move vertically relative to fork positioning frame 123. Forks 129 may be mechanically coupled to fork height adjustment frame 125 such that repositioning of fork height adjustment frame 125 may alter the vertical position of forks 129 with respect to platform 109. In some embodiments, fork height adjustment frame 125 may be moved by one or more hydraulic cylinders.

Figure 1B:
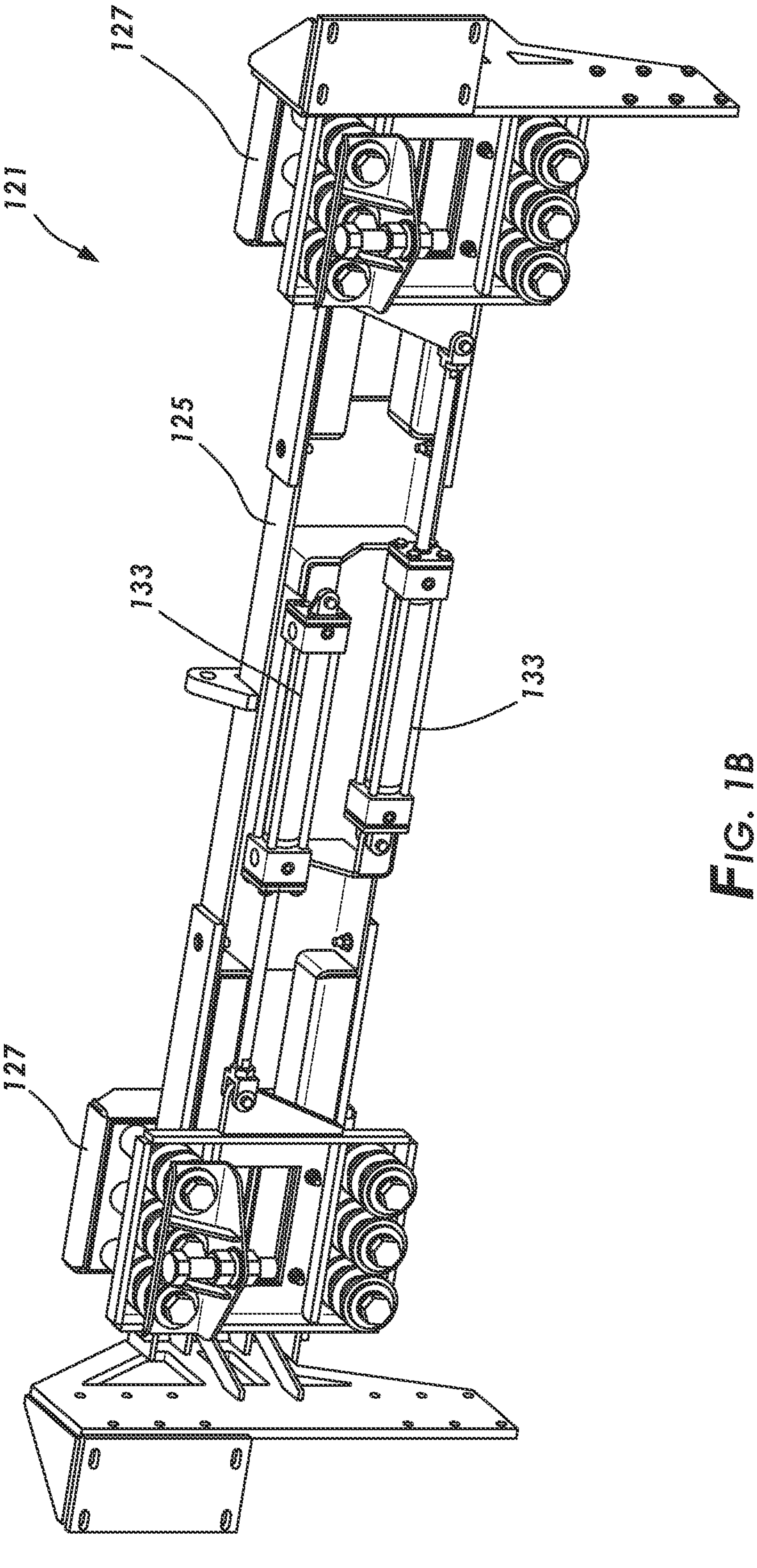
FIG. 1B is a perspective view of the back of the fork height assembly of FIG. 1A.

In some embodiments, fork lateral adjustment frames 127 may be mechanically coupled to fork height adjustment frame 125, as shown in FIG. 1B, such that fork lateral adjustment frames 127 may move horizontally relative to fork height adjustment frame 125. Forks 129 may be mechanically coupled to fork lateral adjustment frames 127 such that forks 129 may be repositioned laterally with respect to platform 109. Fork height adjustment frame 125 and fork lateral adjustment frames 127 may be used together to adjust the height and spacing of forks 129 to align with fork points 12 formed on a container as further described herein below. In some embodiments, each fork lateral adjustment frame 127 may be movable independently or together using lateral adjustment hydraulic cylinders 133.

Figure 1C:
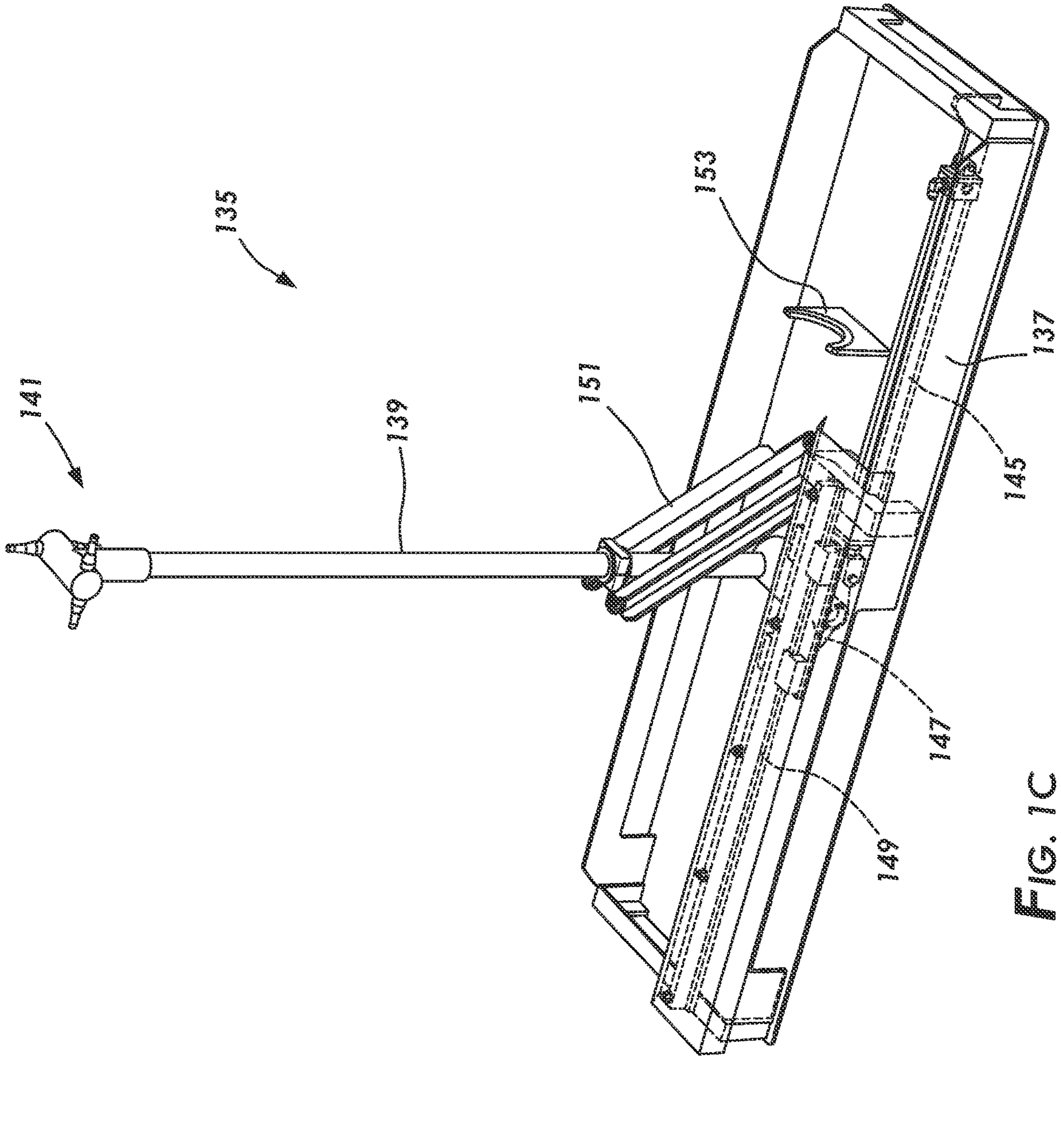
FIG. 1C is a perspective view of a cleaning nozzle assembly consistent with at least one embodiment of the present disclosure in an extended position.

With reference to FIG. 1, in some embodiments, container cleaning apparatus 100 may include cleaning nozzle assembly 135. FIG. 1 shows cleaning nozzle assembly 135 in a collapsed position wherein components of cleaning nozzle assembly 135 are out of alignment with components of platform assembly 103 during operations of platform assembly 103. FIG. 1C shows cleaning nozzle assembly 135 in an extended position wherein components of cleaning nozzle assembly 135 are positioned to clean the interior of a container as further discussed herein below. In some embodiments, cleaning nozzle assembly 135 may include base 137, wand assembly 139, nozzle 141, supply pipe 145, and pivoting actuator assembly 147. Wand assembly 139 may couple nozzle 141 to supply pipe 145 such that fluid supplied to supply pipe 145 may reach nozzle 141 while allowing pivoting wand assembly 139 to pivot relative to base 137. In some embodiments, pivoting actuator assembly 147 may couple between base 137 and pivoting wand assembly 139 to drive the pivoting of wand assembly 139 between the collapsed and extended position. In some embodiments, pivoting actuator assembly 147 may include linear actuator 149, which may include one or more of a hydraulic or pneumatic cylinder or an electromechanical linear actuator, coupled to wand assembly 139 by one or more linkages 151. In some embodiments, base 137 may include saddle 153 to support wand assembly 139 when in the collapsed position.

In some embodiments, nozzle 141 may be coupled to wand assembly 139 such that nozzle 141 may move relative thereto such that fluid ejected from nozzle 141 may be sprayed throughout the interior of a container when cleaning. In some embodiments, the movement of nozzle 141 may be driven by the cleaning fluid passing through and exiting nozzle 141.

An example of a container cleaning operation using container cleaning apparatus 100 will now be described. Container cleaning apparatus 100 may be transported, otherwise positioned, or stored in the initial configuration shown in FIG. 1.

Container cleaning apparatus 100 may be reconfigured to the opened, unlocked position shown in FIG. 2. Fork positioning frame 123 may be positioned to the unlocked position such that forks 129 are out of alignment with platform 109 and front gate 119 may be repositioned to the opened position such that front gate 119 is out of alignment with platform 109. In some embodiments, width guides 113 may be positioned to correspond with the anticipated width of the container to be cleaned.

Figure 3:
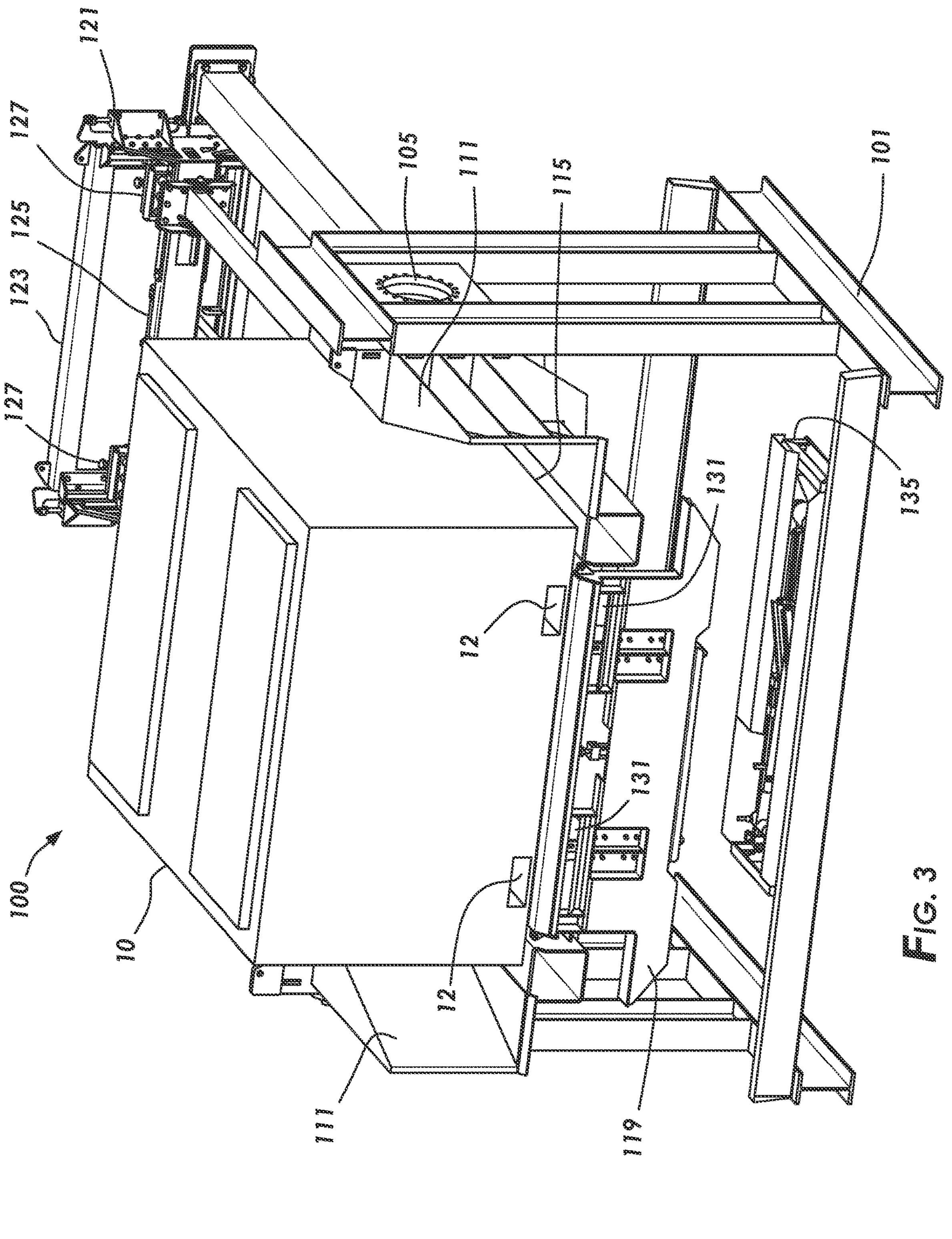
FIG. 3 is a perspective view of the container cleaning apparatus of FIG. 2 with a container inserted thereinto.
Figure 4:
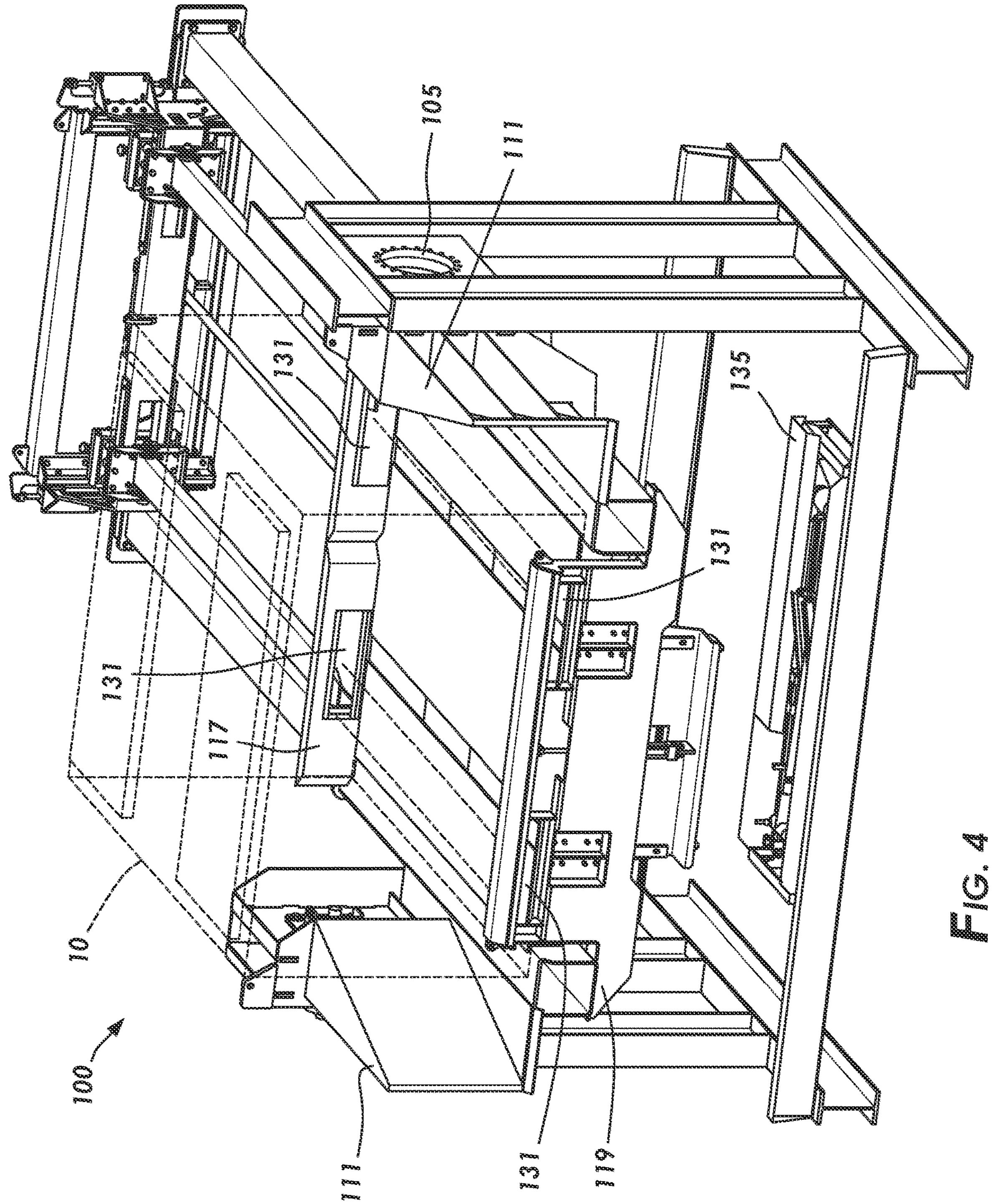
FIG. 4 is a perspective view of the container cleaning apparatus of FIG. 3 in a closed position.
Figure 5:
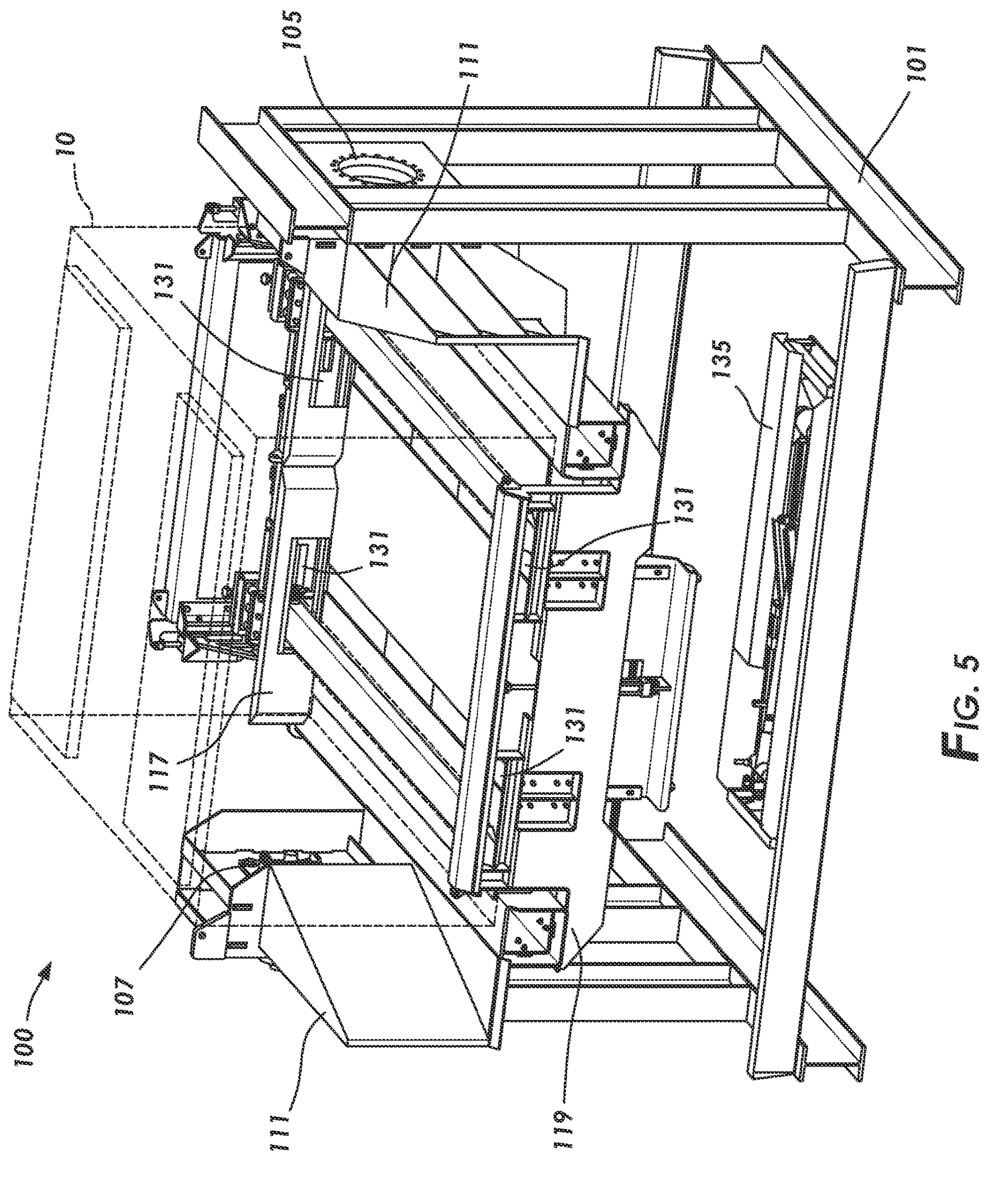
FIG. 5 is a perspective view of the container cleaning apparatus of FIG. 4 in a closed and locked position.

Container 10 may then be positioned into load pocket 115 as shown in FIG. 3. Container 10 may include fork points 12, which may be used to position container 10 into load pocket 115. Front gate 119 may be closed as shown in FIG. 4 such that container 10 is constrained into load pocket 115.

Forks 129 may then be repositioned by adjusting fork height adjustment frame 125 and fork lateral adjustment frames 127 such that forks 129 align with fork points 12 of container 10. Fork positioning frame 123 may then move to the locked position such that forks 129 extend through fork points 12 of container 10 and, if included, fork holes 131 of back wall 117 and front gate 119, locking container 10 to container cleaning apparatus 100 as shown in FIG. 4.

Figure 6:
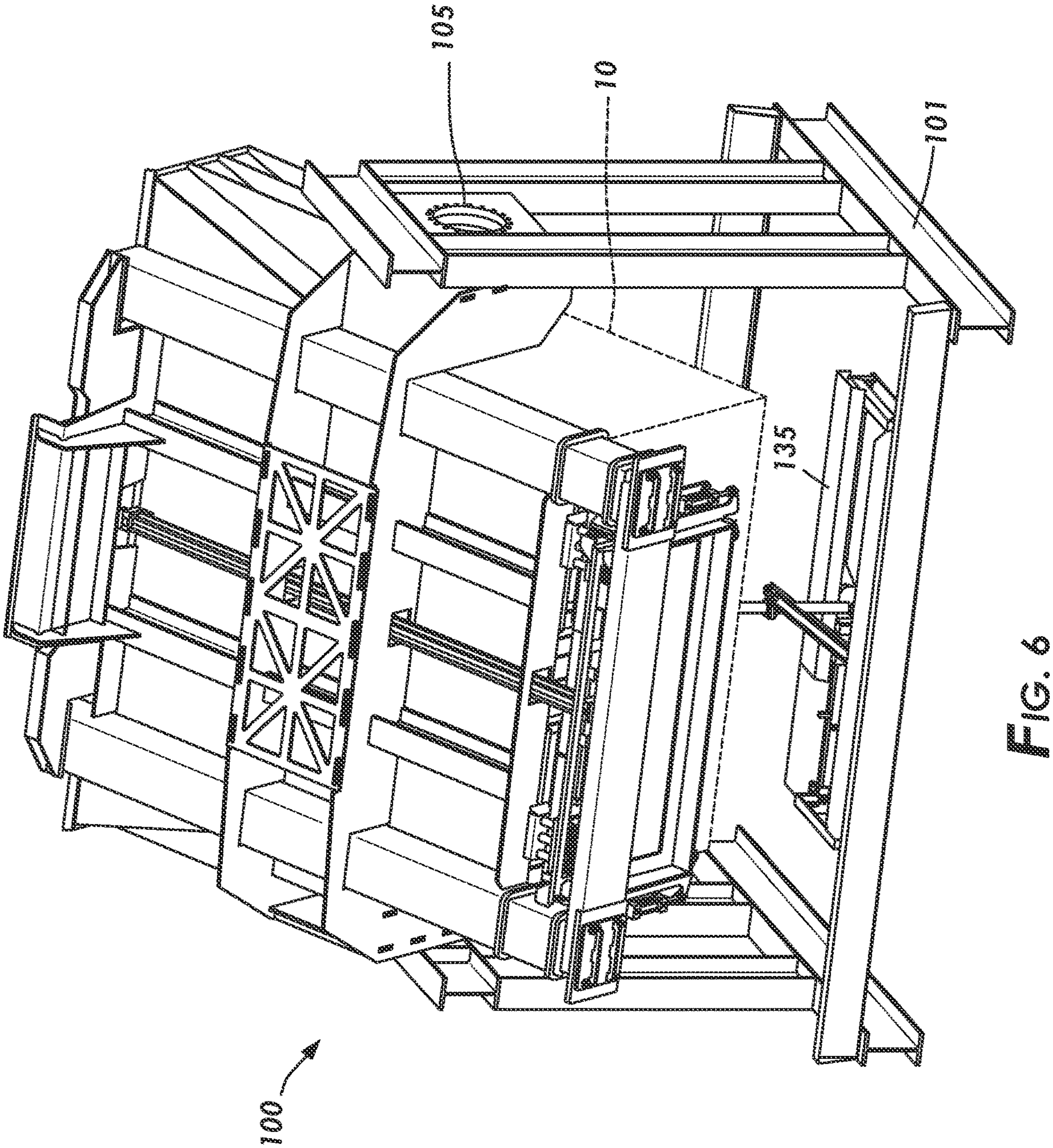
FIG. 6 is a perspective view of the container cleaning apparatus of FIG. 5 in a cleaning position.
Figure 6A:
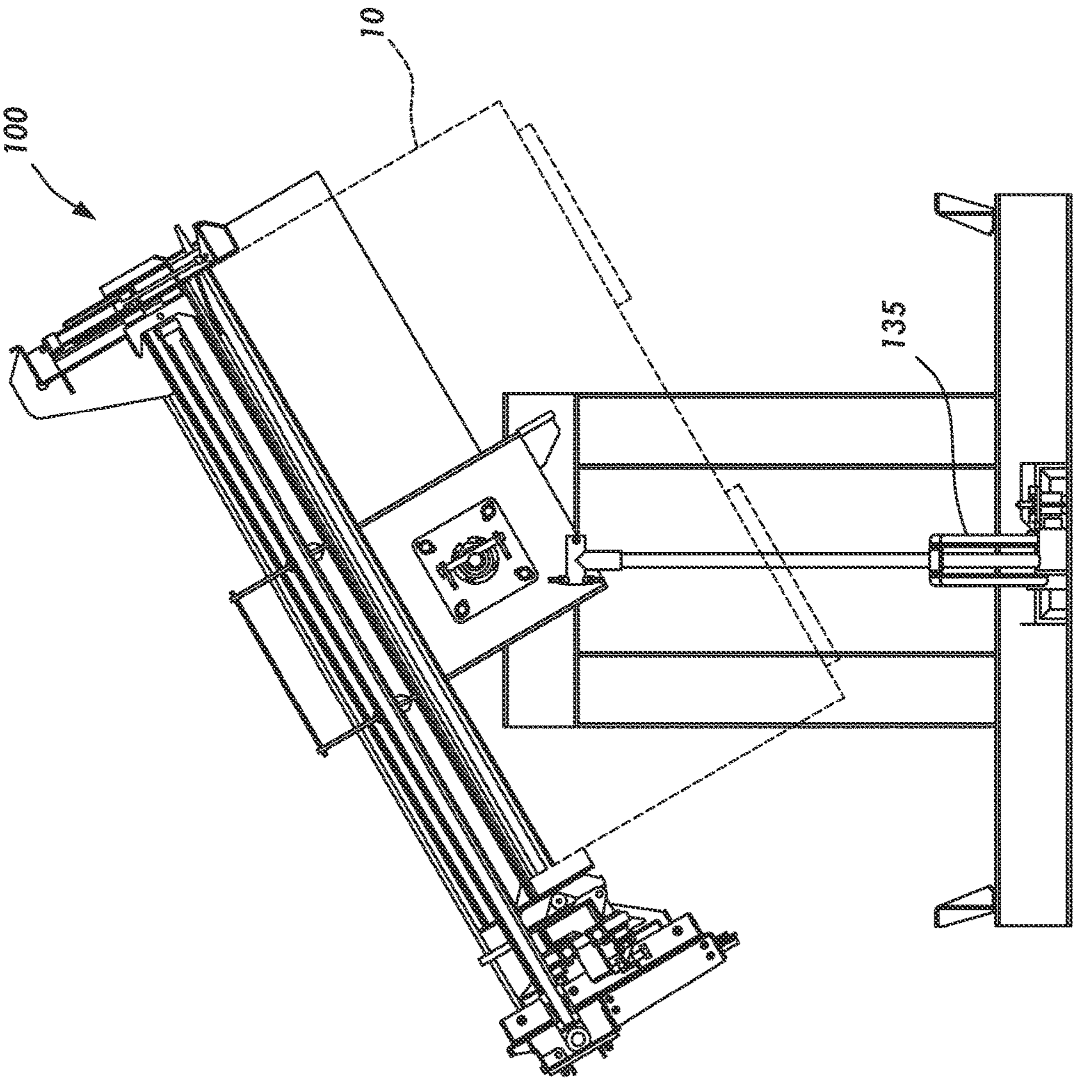
FIG. 6A is a side view of the container cleaning apparatus of FIG. 6.

Platform assembly 103 may then be pivoted relative to frame 101 by pivot driver 107 to the cleaning position wherein container 10 is inverted as shown in FIGS. 6 and 6A. Container 10 may be retained to platform assembly 103 and supported by forks 129. In some embodiments, platform assembly 103 may pivot by an angle less than a full 180° such as, for example and without limitation, between 100° and 170°.

Cleaning nozzle assembly 135 may then be positioned in the extended position such that nozzle 141 is substantially within container 10, and fluid may be flowed through nozzle 141 such that the fluid is expelled through nozzle 141 and is directed by nozzle 141 into contact with the interior of container 10 such that the interior of container 10 is cleaned. Because container 10 is inverted, fluid and any residue or debris from within container 10 may leave container 10 by the action of gravity.

Once sufficiently clean, container 10 may be kept inverted until reaching a desired dryness, at which point container cleaning apparatus 100 may return container 10 to the upright position, unlocking container 10 by extending fork positioning frame 123 and opening load pocket 115 by moving front gate 119. Container 10 may then be extracted from load pocket 115 by, for example and without limitation, a forklift.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A container cleaning apparatus comprising:
- a frame;
- a platform assembly pivotably coupled to the frame, the platform assembly including:
  - a platform;
  - guide walls coupled to the platform;
  - a back wall coupled to the platform;
  - a front gate, the front gate slidingly coupled to the platform; and
  - a fork assembly, the fork assembly including a fork movable between a locked position and an unlocked position; and
- a cleaning nozzle assembly.

2. The container cleaning apparatus of claim 1, wherein the guide walls further comprise width guides, the width guides pivotable relative to other portion of the guide walls.

3. The container cleaning apparatus of claim 1, wherein the fork assembly comprises a fork positioning frame, a fork height adjustment frame, one or more fork lateral adjustment frames, and one or more forks.

4. The container cleaning apparatus of claim 3, wherein the fork positioning frame is coupled to the platform and movable relative to the platform to move the fork assembly between the locked position and the unlocked position.

5. The container cleaning apparatus of claim 3, wherein the fork height adjustment frame is mechanically coupled to the fork positioning frame such that the fork height adjustment frame may move vertically relative to the fork positioning frame.

6. The container cleaning apparatus of claim 3, wherein each fork lateral adjustment frame is coupled to the fork height adjustment frame such that the fork lateral adjustment frames are movable horizontally relative to the fork height adjustment frame.

7. The container cleaning apparatus of claim 3, wherein each fork is coupled to a corresponding fork lateral adjustment frame.

8. The container cleaning apparatus of claim 1, wherein the cleaning nozzle assembly comprises a base, wand assembly, and nozzle, the wand assembly pivotable relative to the base, the nozzle positioned at an end of the wand assembly.

9. A method comprising:
- positioning a container on a container cleaning apparatus, the container cleaning apparatus comprising:
  - a frame;
  - a platform assembly pivotably coupled to the frame, the platform assembly including:
    - a platform;
    - guide walls coupled to the platform;
    - a back wall coupled to the platform;
    - a front gate, the front gate slidingly coupled to the platform; and
    - a fork assembly, the fork assembly including a fork movable between a locked position and an unlocked position; and
  - a cleaning nozzle assembly;
- engaging the container with the fork of the fork assembly;
- pivoting the platform assembly relative to the frame;
- at least partially inverting the container; and
- engaging the cleaning nozzle assembly to spray a cleaning fluid into an interior of the container.

* * * * *